United States Patent
Deng et al.

(10) Patent No.: US 10,859,495 B2
(45) Date of Patent: Dec. 8, 2020

(54) FLUORESCENCE SENSING SYSTEM

(71) Applicant: CORK INSTITUTE OF TECHNOLOGY, Cork (IE)

(72) Inventors: Shijie Deng, Cork (IE); Stephen Hegarty, Cork (IE)

(73) Assignee: CORK INSTITUTE OF TECHNOLOGY, Cork (IE)

( * ) Notice: Subject to any disclaimer, the term of this patent is extended or adjusted under 35 U.S.C. 154(b) by 0 days.

(21) Appl. No.: 16/340,454

(22) PCT Filed: Oct. 10, 2017

(86) PCT No.: PCT/EP2017/075871
§ 371 (c)(1),
(2) Date: Apr. 9, 2019

(87) PCT Pub. No.: WO2018/069358
PCT Pub. Date: Apr. 19, 2018

(65) Prior Publication Data
US 2019/0234878 A1 Aug. 1, 2019

(30) Foreign Application Priority Data
Oct. 11, 2016 (EP) .................................. 16193335

(51) Int. Cl.
*G01N 21/64* (2006.01)
*G01J 1/42* (2006.01)

(52) U.S. Cl.
CPC ........ *G01N 21/6428* (2013.01); *G01J 1/4204* (2013.01); *G01N 21/645* (2013.01); *G01N 21/6486* (2013.01); *G01N 2201/061* (2013.01)

(58) Field of Classification Search
CPC ............. G01N 21/645; G01N 21/6428; G01N 21/6486; G01N 2201/061
See application file for complete search history.

(56) References Cited

U.S. PATENT DOCUMENTS

| | | |
|---|---|---|
| 7,301,158 B1 | 11/2007 | Hoang |
| 7,470,917 B1 | 12/2008 | Hoang et al. |
| 8,994,296 B1 * | 3/2015 | Chan ...................... H04B 45/00 315/362 |
| 2012/0145924 A1 | 6/2012 | Tinsley |
| 2016/0003742 A1 | 1/2016 | Butte et al. |

FOREIGN PATENT DOCUMENTS

| | | |
|---|---|---|
| CN | 103868901 | 6/2014 |
| JP | 2004325174 | 6/2014 |
| WO | 2004/063731 | 7/2004 |
| WO | 2015/142161 | 9/2015 |

OTHER PUBLICATIONS

PCT International Search Report for PCT International Patent Application No. PCT/EP2017/075871; dated Jan. 31, 2018 (5 pages).

* cited by examiner

*Primary Examiner* — David P Porta
*Assistant Examiner* — Fani Boosalis
(74) *Attorney, Agent, or Firm* — K&L Gates LLP

(57) ABSTRACT

The present invention provides a fluorescence sensing system comprising a light source (5) for exciting a sensor material (10), a photo-detector (15) for collecting the fluorescence emitted from the sensor material and a controller (20) coupled to the photo-detector; wherein the controller is configured to perform measurements on the fluorescence signal collected by the photo-detector and adjust the output power of the light source based on the measurements.

14 Claims, 1 Drawing Sheet

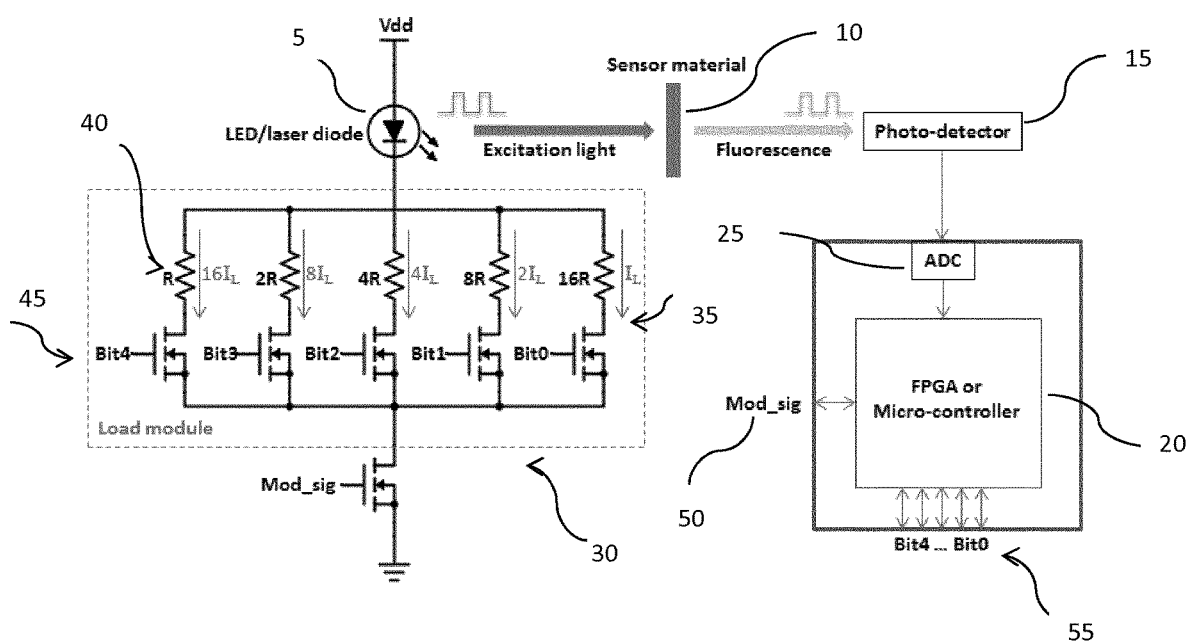

FLUORESCENCE SENSING SYSTEM

CROSS REFERENCE TO RELATED APPLICATIONS

This application is a national phase under 35 U.S.C. § 371 of International Application No. PCT/EP2017/075871 filed Oct. 10, 2017, which claims priority to and benefit of European Patent Application No. 16193335.3 filed Oct. 11, 2016, and the entirety of these applications are incorporated by reference herein.

FIELD

The present invention relates to a fluorescence sensing system. More particularly, the present invention relates to a fluorescence sensing system which can adapt to variable measurement conditions.

BACKGROUND

Many different types of sensing systems are currently in existence, and they are used across a broad range of applications. One known type of sensing system is a fluorescence sensing system. A fluorescence sensing system can be used to detect a wide range of elements, including for example oxygen, pH, carbon dioxide and heavy metal compounds.

A typical fluorescence sensing system comprises a light source and a photo-detector. In use, sensor material is excited by incident light from the light source. The sensor material comprises a fluorescent substance which is present in a sample for detection. The fluorescent substance may be inherent in the sample (i.e. autofluorescence), or the fluorescent substance may be a fluorophore artificially added to the sample, such as for example fluorescein and dansyl. The sensor material then emits a fluorescence signal which has a wavelength different to the wavelength of the incident light. This fluorescence signal is collected by the photo-detector, and data is extracted from the signal. The data may include for example information regarding the lifetime, phase shift or intensity of the fluorescence signal. From this information, the level of the compounds detected by the sensing system can be identified.

One problem associated with conventional fluorescence sensing systems relates to the fact that the one sensing system may be subjected to a variety of different measurement conditions over its lifetime. This is particularly the case for those sensing systems which are adapted for use outdoors, or which are hand held. Measurement conditions which may vary include the distance between the light source and the sensor material, as well as the distance between the sensor material and the photo-detector. Other measurement conditions which may vary include the light attenuation and the ambient light.

Changes in measurement conditions affect the intensity of the fluorescence signal emitted from the sensor material. For example, where the distance between the sensor material and the photo-detector is decreased, the light signal collected by the photo-detector may be strong enough to cause the saturation of the photo-detector, which leads to incorrect detection of a compound. Saturation of the photo-detector can also occur where the system is operating under bright ambient light. Conversely, where the distance between sensor material and the photo-detector is increased, the fluorescence signal collected by the photo-detector will be weaker, and thus result in a decrease in the signal-to-noise ratio (SNR).

It will be appreciated therefore that changes in the measurement conditions experienced by the sensing system can lead to instability in the collection of the fluorescence signal. This instability can in turn reduce the accuracy of the system.

Japanese Patent Publication No. JP2004325174 discloses a fluorescence microscope inspection apparatus which comprises a fluorescence detection unit, a LED light source unit comprising a plurality of LED light sources, a LED light source unit drive circuit and a personal computer provided with a monitor. In one embodiment of the invention, a fluorescence emission from a sample is detected by the detection unit and sent to the computer for analysis and display on the monitor. Based on the analysis, the computer sends a control command to the LED light source unit drive circuit to control the individual currents supplied to each LED light source in the LED light source unit. In an alternative embodiment, the LED light source drive circuit may be manually controlled. This control command is only sent by the computer to the LED light source drive circuit during set-up, rather than during data collection. This patent document further explains that the advantage of controlling the individual currents supplied to each LED light source is that the light from each LED light source can be aligned to the same brightness, and thus uneven illumination on the surface of a sample can be prevented. It will further be appreciated that the disclosed arrangement comprises a distributed fluorescence system, which is accordingly only suitable for use in a laboratory environment.

US Patent Publication No. US 2012/0145924 describes a fluorescence emission detection system comprising an excitation source and a fluorescence emissions detection circuit. In this system, saturation of the amplifier in the detection circuit is prevented through the adjustment of the gain of the amplifier by means of control signals. However, one drawback of this technique relates to the fact that as the amplifier also receives noise in the form of the ambient light signal, any increase in the gain of the amplifier will result in a corresponding amplification of the noise detected by the system.

It is an object of the present invention to overcome at least one of the above mentioned problems.

SUMMARY

According to a first aspect of the invention, there is provided, as set out in the appended claims, a portable fluorescence sensing device comprising:
a light source for exciting a sensor material;
a photo-detector for collecting the fluorescence emitted from the sensor material; and
a controller coupled to the photo-detector;
wherein the controller is configured to:
analyse the fluorescence signal collected by the photo-detector; and adjust the output power of the light source based on the analysis.

In an embodiment the controller is configured to analyse the peak intensity, $V_p$, and the valid fluorescence intensity signal, $V_{valid\ intensity}$, of the fluorescence signal, and adjust the output power of the light source based on the analysis.

In an embodiment the valid fluorescence intensity signal, $V_{valid\ intensity}$, of the fluorescence signal is calculated by the equation $V_{valid\ intensity} = V_p - V_b$, wherein $V_b$ corresponds to the intensity of the ambient light.

In an embodiment the controller is configured to measure the intensity of the ambient light before the light source is powered on.

In an embodiment the controller is configured to compare the measured peak intensity of the fluorescence signal, $V_p$, to a saturation intensity threshold value;

and decrease the output power of the light source if the peak intensity of the fluorescence signal is determined to be greater than the saturation intensity threshold value.

In an embodiment the controller determines that the peak intensity of the fluorescence signal is less than the saturation intensity threshold value, the controller is configured to determine whether the measured valid fluorescence intensity signal of the fluorescence signal, $V_{valid\ intensity}$, is within a predefined operating range, and;

if the valid fluorescence intensity signal is greater than the predefined operating range, the controller is configured to decrease the output power of the light source; and if the valid fluorescence intensity signal is less than the predefined operating range, the controller is configured to increase the output power of the light source.

In an embodiment the saturation intensity threshold value and the predefined operating range are programmable.

In an embodiment the light source comprises a variable resistive load, and wherein the output power of the light source is adjusted by varying the resistive load.

In an embodiment the resistive load comprises a plurality of channels, each channel comprising a resistor in series with a switch, and wherein the controller controls the operation of each of the switches to vary the resistive load.

In an embodiment each of the resistors comprises a different resistive value.

In an embodiment the resistive load comprises five channels, and wherein the values of the resistors in the channels are set to R, 2R, 4R, 8R and 16R.

In an embodiment the controller comprises a Field Programmable Gate Array, FPGA.

In another embodiment the controller comprises a microcontroller.

In an embodiment the system further comprises an analog to digital converter, ADC, coupled between the photo-detector and the controller.

In an embodiment the light source is modulated by a pulsed signal generated by the controller.

In an embodiment the light source comprises a light emitting diode, LED.

In another embodiment the light source comprises a laser diode.

In an embodiment the sensor material comprises a fluorescent substance which is present in a sample for detection.

In another embodiment of the invention there is provided a method for adjusting the incident light power in a portable fluorescence sensing device, the fluorescence sensing device comprising a light source for exciting a sensor material, and a photo-detector for collecting the fluorescence emitted from the sensor material, the method comprising the steps of:

analysing the fluorescence signal collected from the photo-detector; and adjusting the output power of the light source based on the analysis.

In an embodiment the step of analysing comprises measuring the peak intensity, $V_p$, and the valid fluorescence intensity signal, $V_{valid\ intensity}$, of the fluorescence signal.

In an embodiment the valid fluorescence intensity signal, $V_{valid\ intensity}$, of the fluorescence signal is calculated by the equation $V_{valid\ intensity}=V_p-V_b$, wherein $V_b$ corresponds to the intensity of the ambient light.

In an embodiment the method further comprises measuring the intensity of the ambient light before the light source is powered on.

In an embodiment the method further comprises comparing the measured peak intensity of the fluorescence signal, $V_p$, to a saturation intensity threshold value;

and decreasing the output power of the light source if the peak intensity of the fluorescence signal is determined to be greater than the saturation intensity threshold value.

In an embodiment the method further comprises if it is determined that the peak intensity of the fluorescence signal is less than the saturation intensity threshold value, determining whether the measured valid fluorescence intensity signal of the fluorescence signal, $V_{valid\ intensity}$, is within a predefined operating range, and; if the valid fluorescence intensity signal is greater than the predefined operating range, decreasing the output power of the light source; and if the valid fluorescence intensity signal is less than the predefined operating range, increasing the output power of the light source.

In an embodiment the step of adjusting the output power of the light source comprises adjusting the resistive load of the light source.

In an embodiment, the portable device comprises a hand held device.

In another embodiment of the invention there is provided a computer implemented system for adjusting the incident light power in a fluorescence sensing system, the system configured with one or more modules to perform the above method.

In another embodiment of the present invention, there is also provided a computer program product, comprising a computer usable medium having a computer readable program code embodied therein, said computer readable program code adapted to be executed to implement a method as described herein.

In another embodiment of the invention there is provided, a fluorescence sensing system comprising:

a light source for exciting a sensor material;

a photo-detector for collecting the fluorescence emitted from the sensor material; and a controller coupled to the photo-detector;

wherein the controller is configured to:

perform measurements on the fluorescence signal collected by the photo-detector; and adjust the output power of the light source based on the measurements.

In another embodiment of the invention there is provided a method for adjusting the incident light power in a fluorescence sensing system, the fluorescence sensing system comprising a light source for exciting a sensor material, and a photo-detector for collecting the fluorescence emitted from the sensor material, the method comprising the steps of:

performing measurements on the fluorescence signal collected from the photo-detector; and adjusting the output power of the light source based on the measurements.

BRIEF DESCRIPTION OF THE DRAWINGS

The invention will be more clearly understood from the following description of an embodiment thereof, given by way of example only, with reference to the accompanying drawings, in which:—

FIG. 1 shows one embodiment of the components of the fluorescence sensing system of the invention.

DETAILED DESCRIPTION OF THE DRAWINGS

The present invention provides a fluorescence sensing system which intelligently adjusts the intensity of the fluorescence signal emitted from the sensor material in order to improve the accuracy and the robustness of the system.

FIG. 1 shows one embodiment of the main components of the fluorescence sensing system of the present invention, which in the described embodiment of the invention comprises a portable fluorescence sensing device, such as for example a hand held device. It comprises a light source 5 for exciting a sensor material 10 and a photo-detector 15 for collecting the fluorescence emitted from the sensor material 10. A controller 20 is coupled to the output of the photo-detector 15. The controller 20 is configured to analyse the intensity of the fluorescence signal collected by the photo-detector 15 and adjust the output power of the light source 5 based on the analysis.

An analog to digital converter (ADC) 25 is coupled between the photo-detector 15 and the controller 20. The ADC 25 converts the analog signal output from the photo-detector 15 to a digital signal for input to the controller 20.

The adjustment of the output power of the light source 5 is facilitated by the light source 5 comprising a variable resistive load module 30. The load module 30 comprises a plurality of channels 35, each channel 35 comprising a resistor 40 in series with a switch 45, such as a N-MOSFET as shown. In the described embodiment, the load module 30 comprises five channels 35, with the values of the resistors in the channels set to R, 2R, 4R, 8R and 16R. It will be understood that this makes the current flowing through each channel $16I_L$, $8I_L$, $4I_L$, $2I_L$ and $I_L$ respectively. The resistive load of the load module 30 is varied by configuring each switch 45 to either its open or its closed position by means of a programmable digital code 55. In the described embodiment of the invention, the digital code 55 comprises a five bit digital code (Bit4 . . . Bit0), with each switch 45 being controlled by one bit of the code. Thus, the current flowing through the load module 30 can be linearly controlled by setting the digital code 55. It will be appreciated that this results in a corresponding linear adjustment in the output power of the light source 5.

In accordance with the present invention, the controller 20 programs the digital code 55 to configure the switches 45 to provide the resistive load appropriate for the intensity of the fluorescence signal collected by the photo-detector 15. The controller may be for example a Field Programmable Gate Array (FPGA) or a micro-controller.

In use, the controller 20 measures the intensity of the ambient light, $V_b$, before the light source 5 is powered on. The light source 5 is then modulated by a pulsed signal "Mod_sig" 50 generated by the controller 20 in order to illuminate the sensor material 10. While the sensing measurements are taking place, the photo-detector 15 collects the fluorescence signal emitted from the sensor material 10. The collected fluorescence signal is then converted from an analog to a digital signal by means of the ADC 25, and output to the controller 20 for processing.

The controller 20 measures the intensity of the peak fluorescence signal, $V_p$. Using the measured value of the intensity of the peak fluorescence signal, $V_p$, the controller 20 calculates the value of the valid fluorescence intensity signal, $V_{valid\ intensity}$, where:

$$V_{valid\ intensity} = V_p - V_b$$

The controller 20 compares the value of the peak fluorescence signal, $V_p$ with a predefined saturation intensity threshold value. If this comparison determines that the peak fluorescence signal is higher than the saturation intensity threshold value, the controller 20 programs the digital code 55 to configure the switches 45 such that the output power of the light source 5 is reduced to its lowest value. This in turn causes the intensity of the fluorescence signal emitted from the sensor material 10 to be decreased, in order to avoid saturation of the photo-detector 15. If on the other hand the comparison determines that the peak fluorescence signal is less than the saturation intensity threshold value, the controller 20 determines whether the valid fluorescence intensity signal, $V_{valid\ intensity}$ lies within a predefined desired operating range. This operating range corresponds to a range which has been found to keep the fluorescence lifetime calculation stable.

If the valid fluorescence intensity signal is determined to lie within this predefined operating range, the controller 20 does not make any adjustment of the output power of the light source 5. However, if it is determined that the valid fluorescence intensity signal is greater than this predefined operating range, the controller programs the digital code 55 to configure the switches 45 such that the output power of the light source 5 is reduced to its lowest value. Conversely, if it is determined that the valid fluorescence intensity signal is less than this predefined operating range, the controller 20 programs the digital code 55 to configure the switches 45 such that the output power of the light source 5 is increased. This causes the intensity of the fluorescence signal emitted from the sensor material 10 to be increased.

The above measurement and comparison steps are repeated for each adjustment of the output power of the light source 5. Thus, the output power of the light source 5 is adjusted as necessary in response to the measurement conditions. As a result, the intensity of the fluorescence signal emitted from the sensor material 10 can be automatically optimised for good signal to noise level and non-saturation of the detector.

The values of the saturation intensity threshold and the operating range are programmable by the end user, depending on the desired application of the sensing system. In one embodiment of the invention, the value for the saturation intensity threshold is chosen to be 2150 mV, while the value for the operating range is chosen to be between 700 mV and 1500 mV.

In the described embodiment of the invention, the light source is shown as a light emitting diode (LED) or a laser diode. However, it should be appreciated that any other suitable light source could be used.

It will be appreciated from the above description that the number of channels provided by the load module should be such that the lowest value of output power of the light source does not correspond to a value which saturates the photo-detector under any measurement condition to which the sensing system may be exposed. Thus, while the described embodiment of the invention describes the load module comprising five channels, a greater number of channels may be required, depending on the application in which the sensing system is to be used.

The present invention provides numerous advantages over conventional fluorescence sensing systems. Due to the fact that the light source is typically fixed in conventional fluorescence sensing systems, the working distance and the sensing accuracy of such systems are limited, in order to avoid inaccurate readings caused by either saturation of the photo-detector or low SNR. In contrast, the system of the present invention is able to provide a linear and a digital adjustment of the output power of its light source in accordance with the measurement conditions in which the system is being used, due to its digitally controlled load module. This enables the system to prevent the fluorescence signal emitted from the sensor material from saturating the photo-detector, as well as providing a reasonable SNR, and thus provides a sensing system of improved accuracy. It also greatly enhances the performance of the sensing system under various measurement conditions.

The fluorescence sensing system of the present invention is suitable for use in a wide variety of applications. One such application is environment monitoring, for example the monitoring of $O_2$, pH, $CO_2$ and heavy metal compounds. Other applications include clinical diagnostics and quality control for industrial manufacturing.

The system of the present invention is also very suitable for use in outdoor measuring and in hand held portable products, where the working conditions can easily fall outside the limits of conventional fluorescence sensing systems.

The invention claimed is:

1. A portable fluorescence sensing device comprising:
a light source for exciting a sensor material;
a photo-detector for collecting the fluorescence emitted from the sensor material; and
a controller coupled to the photo-detector;
wherein the controller is configured to:
analyse the fluorescence signal collected by the photo-detector;
analyse a peak intensity, Vp, and a valid fluorescence intensity signal, $V_{valid\ intensity}$, of the fluorescence signal; and
adjust the output power of the light source based on the analysis.

2. The device of claim 1, wherein the valid fluorescence intensity signal, $V_{valid\ intensity}$, of the fluorescence signal is calculated by the equation $V_{valid\ intensity}=V_p-V_b$, wherein $V_b$ corresponds to the intensity of ambient light.

3. The device of claim 2, further wherein the controller is configured to measure the intensity of the ambient light before the light source is powered on.

4. The device of claim 1, wherein the controller is configured to compare the measured peak intensity of the fluorescence signal, $V_p$, to a saturation intensity threshold value; and
decrease the output power of the light source if the peak intensity of the fluorescence signal is determined to be greater than the saturation intensity threshold value.

5. The device of claim 4, further wherein if the controller determines that the peak intensity of the fluorescence signal is less than the saturation intensity threshold value, the controller is configured to determine whether the measured valid fluorescence intensity signal of the fluorescence signal, $V_{valid\ intensity}$, is within a predefined operating range, and;
if the valid fluorescence intensity signal is greater than the predefined operating range, the controller is configured to decrease the output power of the light source; and
if the valid fluorescence intensity signal is less than the predefined operating range, the controller is configured to increase the output power of the light source.

6. The device of claim 5, wherein the saturation intensity threshold value and the predefined operating range are programmable.

7. The device of claim 1, wherein the light source comprises a variable resistive load, and wherein the output power of the light source is adjusted by varying the resistive load.

8. The device of claim 7, wherein the resistive load comprises a plurality of channels, each channel comprising a resistor in series with a switch, and wherein the controller controls the operation of each of the switches to vary the resistive load.

9. The device of claim 8, wherein each of the resistors comprises a different resistive value.

10. The device of claim 9, wherein the resistive load comprises five channels, and wherein the values of the resistors in the channels are set to R, 2R, 4R, 8R and 16R.

11. The device of claim 1, wherein the controller comprises a Field Programmable Gate Array, FPGA or a microcontroller.

12. The device of claim 1, wherein the sensor material comprises a fluorescent substance which is present in a sample for detection.

13. A method for adjusting the incident light power in a portable fluorescence sensing device, the fluorescence sensing device comprising a light source for exciting a sensor material, and a photo-detector for collecting the fluorescence emitted from the sensor material, the method comprising the steps of:
analysing the fluorescence signal collected from the photo-detector;
analyse a peak intensity, Vp, and a valid fluorescence intensity signal, $V_{valid\ intensity}$, of the fluorescence signal; and
adjusting the output power of the light source based on the analysis.

14. A computer program product, comprising a computer usable medium having a computer readable program code embodied therein, said computer readable program code adapted to be executed to implement a method according to claim 13.

* * * * *